Figures 1, 2, 3, 4:
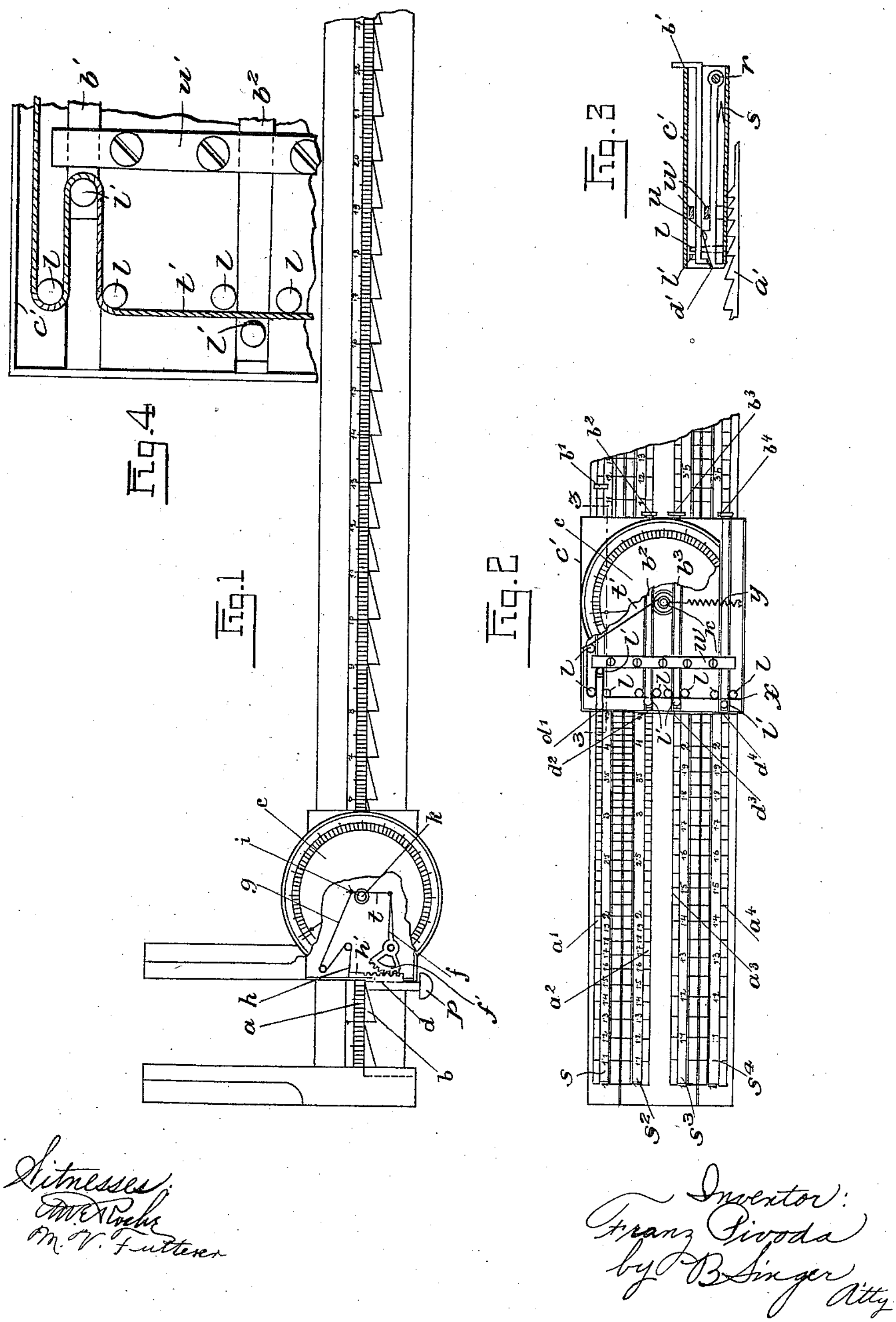

F. PIVODA.

MICROMETER MEASURING ATTACHMENT FOR MEASURING RULES WITH ANY GRADUATION.

APPLICATION FILED NOV. 14, 1911.

1,059,757. Patented Apr. 22, 1913.

Witnesses:
C. W. E. Roehr
M. V. Futterer

Inventor:
Franz Pivoda
by B. Singer Atty

COLUMBIA PLANOGRAPH CO., WASHINGTON, D. C.

UNITED STATES PATENT OFFICE.

FRANZ PIVODA, OF KREMSIER, AUSTRIA-HUNGARY.

MICROMETER MEASURING ATTACHMENT FOR MEASURING-RULES WITH ANY GRADUATION.

1,059,757. Specification of Letters Patent. Patented Apr. 22, 1913.

Application filed November 14, 1911. Serial No. 660,295.

*To all whom it may concern:*

Be it known that I, Franz Pivoda, electrical engineer, a subject of the Austrian Emperor, and residing at Kremsier, Moravia, Austria-Hungary, have invented certain new and useful Improvements in Micrometer Measuring Attachments for Measuring-Rules with Any Graduation, of which the following is a specification.

The present invention relates to a micrometer-measuring attachment for measuring rules, which has the object to admit of taking precision measurements with a measuring rule to which it is attached. By means of this device a micrometer is employed with advantage in taking linear measurements, by the single graduations of a rule being transferred, by means of a suitable device in a pantograph manner, to the indicator of a micrometer, so that the intermediate values within the said single graduations are not rated with the eye, but read directly and accurately on the micrometer indicator.

In the drawings, forming a part of this specification: Figure 1 is a caliber square showing the application of my invention thereto, parts being broken away to disclose details of construction. Fig. 2 is a view similar to Fig. 1 of a slide rule, showing the application of my invention thereto. Fig. 3 is a sectional view on the lines 3—3 of Fig. 2, the tappet actuating bar being shown in a normal position. Fig. 4 is an enlarged fragmentary view of the left upper corner of the casing, movable on the rule, showing Fig. 2, together with associated parts.

Similar characters refer to similar parts throughout the views.

With particular reference to Fig. 1, which discloses a measuring instrument known as a caliber square fitted with the improvement, it will be seen that the latter consists of a toothed bar *b* arranged parallel to the graduation of the rule *a*. The teeth of this bar *b* are arranged parallel to the graduation of the rule *a* and resemble those of a wood-saw blade; the pitch of the teeth being equal to the graduations of the rule and the teeth are all of uniform height. Along this toothed bar *b* travels a micrometer *c*, provided with a tappet *d*. This tappet is normally held, by means of a spring *h* engaging the end of a rack *h'* carried by the tappet in a position clear of the said teeth but can be manually pressed down by aid of head *p*, so as to bear against any one of the teeth. Upon the tappet *d* being pressed down against the face of a tooth a lever *f* will be actuated through its segment *f'* meshing with rack *h'*, and an index spindle *k* of the micrometer indicator will be turned by means of a thread *t* wound around it and attached at one end to the lever *f*, at the other to a spring *g*, as at *i*, the said spring holding the thread taut. The ratio of gearing is such, that when the tappet moves along the face of a tooth from the highest point to the lowest, the index will play over the micrometer dial of the indicator from graduation marks 0 to 10, or any other desirable division of the dial. This micrometer which may also be constructed in any other suitable manner, has the object to transfer the fraction of the graduation of the rule by means of the incline of the respective tooth and the transmission gear to the micrometer dial where it is read on a finer graduation by means of the index.

With particular reference to Fig. 2, I have here shown a slide-rule with logarithmic division and the hereinbefore described principle of micrometer measuring applied thereto. As the method of calculating by means of a slide-rule consists in adding and subtracting logarithmic lengths, the slide rule is practically also a kind of measuring instrument. In this case the constructional form of the attachment is somewhat modified. Essentially it, however, is constructed on the same principle as shown in Fig. 1 and therefore only the chief parts of this constructional form shall be referred to.

The slide rule, Fig. 2, has four logarithmic scales $s'$, $s^2$, $s^3$, and $s^4$, and therefore also four toothed bars $a'$, $a^2$, $a^3$, and $a^4$, respectively, which latter run parallel with the former and the teeth of which have the same pitch as the length of the respective graduations, but are uniform in height throughout. They are arranged vertically at the side of the scales. The micrometer *c* is constructed in such a manner, that the measurement may be made alternately at the one or the other toothed bar. For this purpose it is fitted with four tappets $d'$, $d^2$, $d^3$, $d^4$, the arrangement of which will be subsequently described in connection with Fig. 3.

The tappets $d'$, $d^2$, $d^3$, and $d^2$, are pivoted to the micrometer case $c'$, as by pin $r$, and are normally held out of engagement with the teeth of the toothed bar by any suitable means, such as by expansion springs $s$. Each bar has an inclined face, indicated by $u$ in Fig. 3 upon which acts a tappet actuating bar $b'$, that is, each of the tappets $d'$, $d^2$, $d^3$ and $d^4$ is provided with an actuating bar $b'$, $b^2$, $b^3$ and $b^4$, respectively, which, when drawn from the casing $c'$ depresses the tappet until it contacts with the face of the teeth of its respective bar, as is obvious from Fig. 3 of the drawing. Transverse bars $w$ are carried by the case $c'$ to retain the tappets and actuating bars in operative relation to each other.

A plurality of lugs or suitable abutments $l$ are carried by the casing $c'$, two at each side of the tappet actuating bars, and the latter elements are provided with a lug $l'$ so disposed as to be closely adjacent the lugs $l$ when the actuating bars are in a position not acting upon the tappets. A thread $t'$ is secured to the casing $c'$ as at $x$ and trained between the lugs $l$ and $l'$, as clearly shown in Fig. 4 of the drawing, said thread being trained about the micrometer index spindle $k$ and having its other end secured to a spiral spring $y$ also secured to the casing $c'$. This spring $y$ retains the thread $t'$ taut.

The operation of the device is as follows:—Assuming that it is desired to actuate the micrometer index in connection with the scale $s'$, then tappet actuating rod $b'$ is drawn from the casing, as shown in Fig. 2, depresses the tappet $d'$ which engages the face of one of the teeth of the bar $a'$. This outward movement of bar $b'$ is limited by engagement of the tappet with the tooth, and its lug $l'$ draws on thread $t'$ which then becomes looped about the lugs $l$ as shown in Fig. 4 actuating the micrometer index spindle in proportion to the distance bar $b'$ may be drawn from the casing.

By means of the present micrometer measuring attachment it is possible to take measurement with a rule at an accuracy of one hundredth of a millimeter, to make calculations on a slide rule up to several decimal figures and it will for reason of these advantages be a valuable aid with all measuring instruments both with rectilinear or circular scales, and with uniform or varying pitch of the graduations.

I claim:

1. In micrometer measuring attachments for measuring rules, with graduations, the combination of a toothed bar arranged longitudinally of the scale with the bases of the teeth alined with the graduations on the rule, said teeth being of uniform height, and a micrometer including an indicator and means for contact with the face of any of the teeth of said bar, operatively connected with said indicator to actuate the same according to the point of contact of said means with the face of any one of said teeth, substantially as and for the purpose set forth.

2. In micrometer measuring attachments for measuring rules, with graduations, the combination of a toothed bar arranged longitudinally of the scale with the bases of the teeth alined with the graduations on the rule, said teeth being of uniform height and a micrometer including a graduated dial, an index for said dial, and a member operatively connected with said index adapted to be brought into contact with the face of any of said teeth to actuate said index accordingly, substantially as and for the purpose set forth.

3. In micrometer measuring attachments for measuring rules, the combination of teeth arranged along said rules each tooth being disposed with its base alined to the graduations of the rule, the teeth being of uniform height and length, and a micrometer including an indicator and means operable upon the face of the said teeth and operatively connected with said indicator for actuating the same proportionate to the position of said means upon the face of any one of said teeth, substantially as and for the purpose set forth.

4. In micrometer measuring attachments for measuring rules with graduations, the combination of a serrated bar arranged longitudinally of the scale with the bases of the teeth alined with the graduations on the rule, said bases being of uniform length, a support carried by said rule movable longitudinally of said bar, a dial carried by said support, an index for said dial provided with a spindle, means carried by said support adapted to be brought into contact with the face of any of said teeth, a device for actuating said means, a flexible member operatively connected with said last mentioned means to be actuated by movement thereof and twirled about the spindle of said index to actuate the same, said flexible member being stationarily connected to said support at one end, and yieldable means supporting the other end of said flexible member, substantially as and for the purpose set forth.

In testimony whereof I affix my signature in presence of two witnesses.

FRANZ PIVODA.

Witnesses:
IGNAZ KURRSCHMACHT,
AUGUST FUGGER.

Copies of this patent may be obtained for five cents each, by addressing the "Commissioner of Patents, Washington, D. C."